Aug. 10, 1926.
R. O. NELSON
AUTOMATIC PHONOGRAPH
Filed Nov. 26, 1923    7 Sheets-Sheet 1
1,595,241
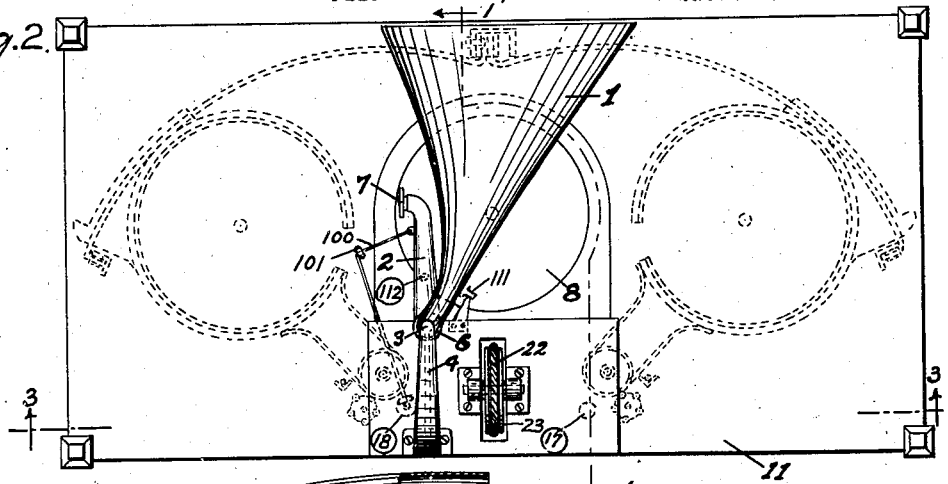
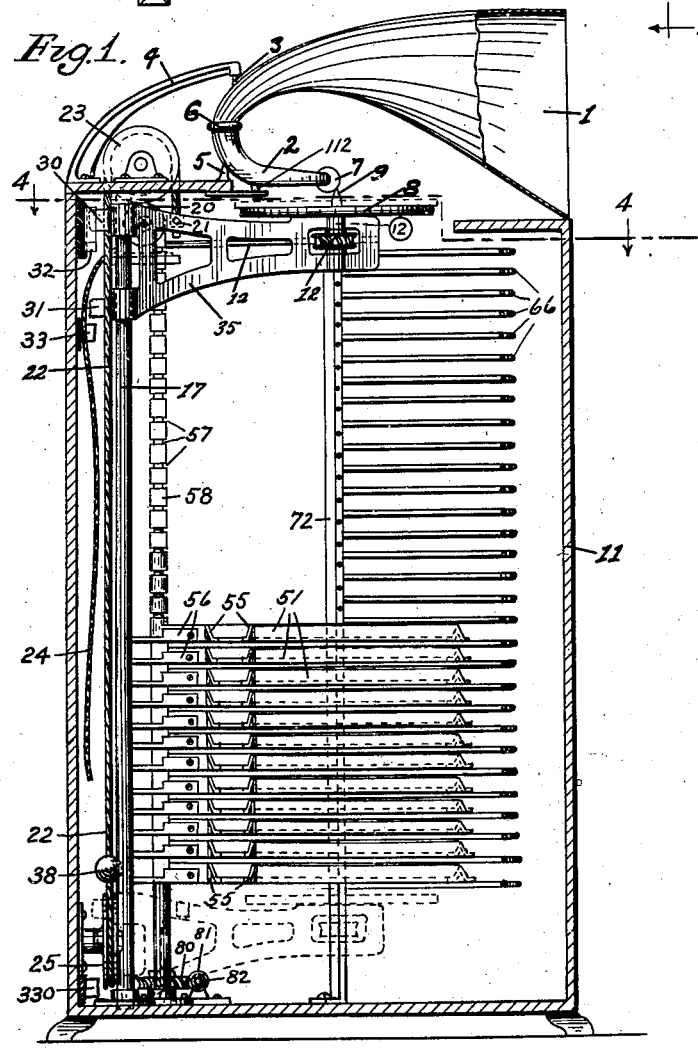
Inventor
R. O. NELSON
By his Attorney

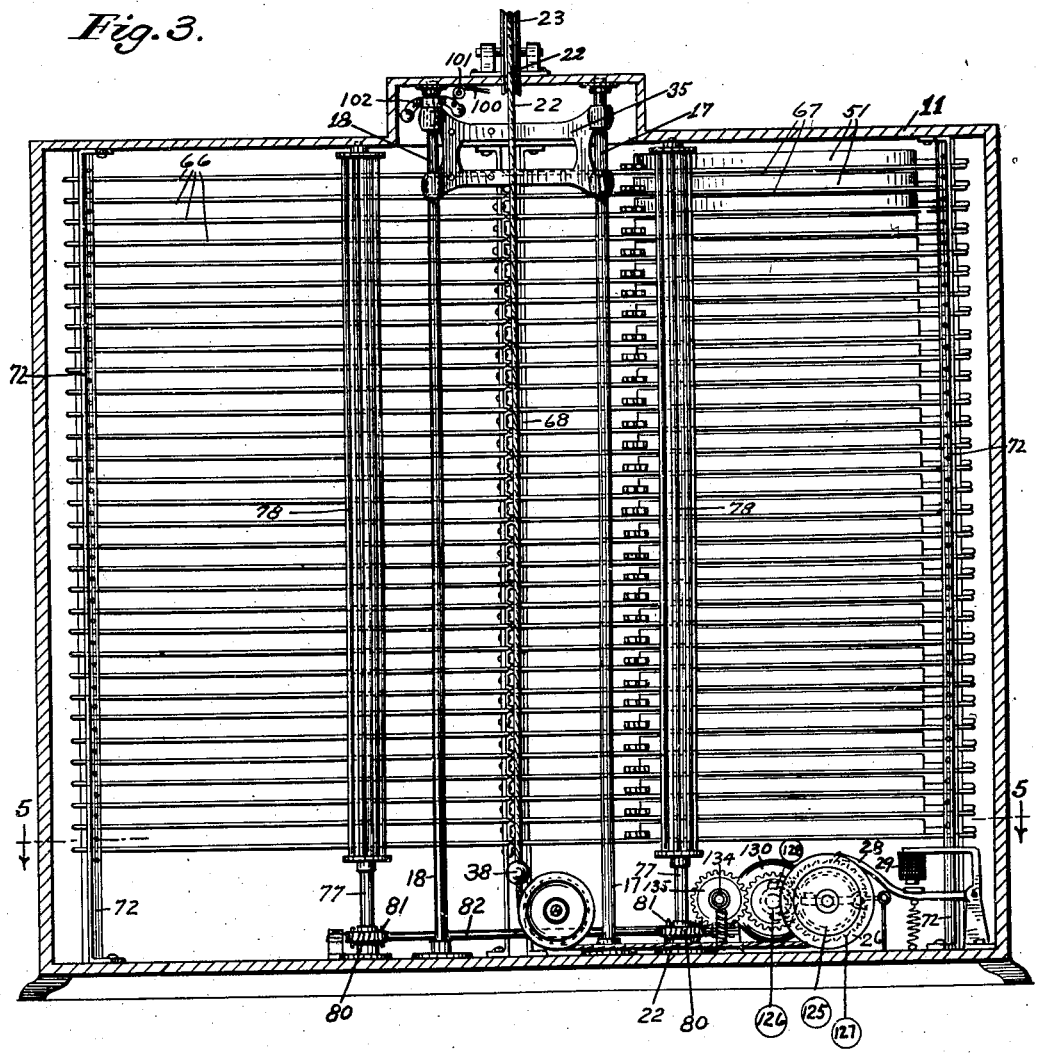

Aug. 10, 1926.

R. O. NELSON 1,595,241

AUTOMATIC PHONOGRAPH

Filed Nov. 26, 1923    7 Sheets-Sheet 3

Inventor
R. O. NELSON
By his Attorney

Aug. 10, 1926.

R. O. NELSON

AUTOMATIC PHONOGRAPH

Filed Nov. 26, 1923

Inventor
R. O. NELSON
By his Attorney

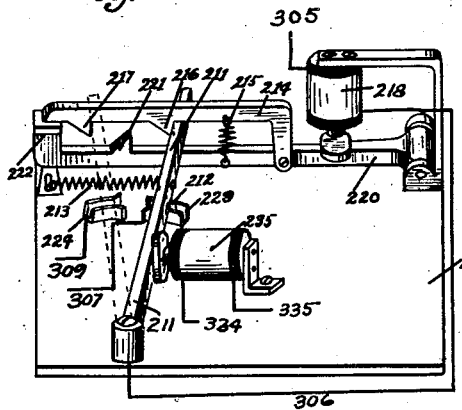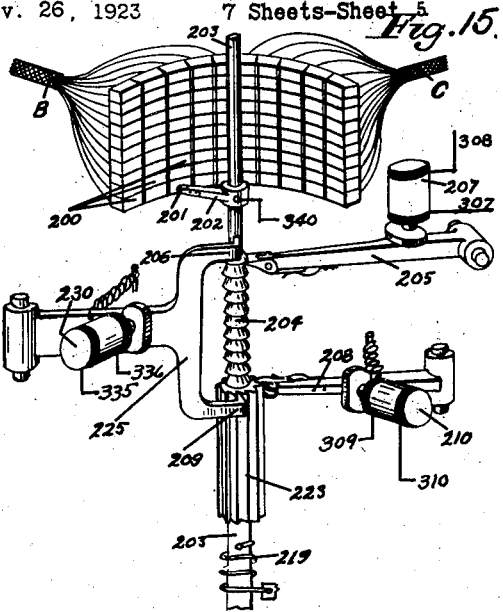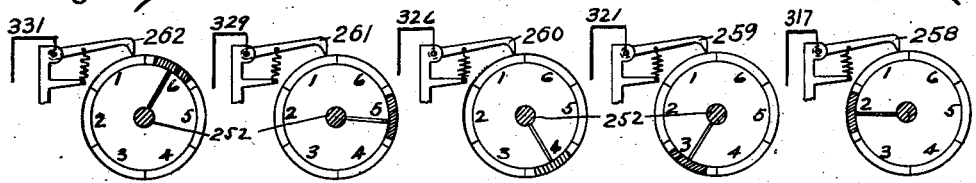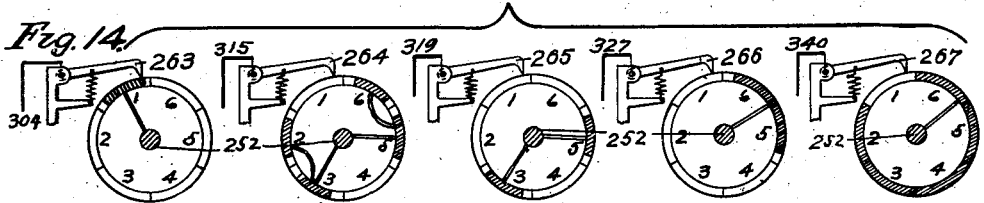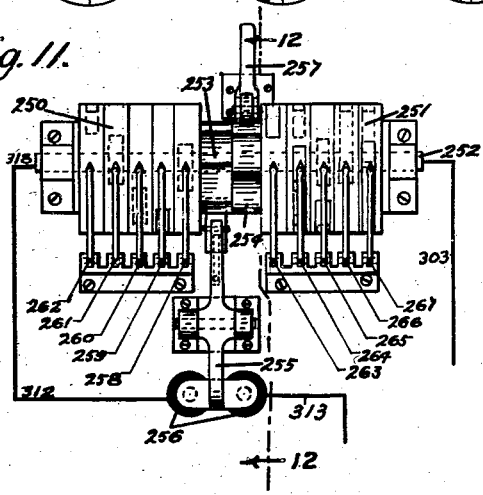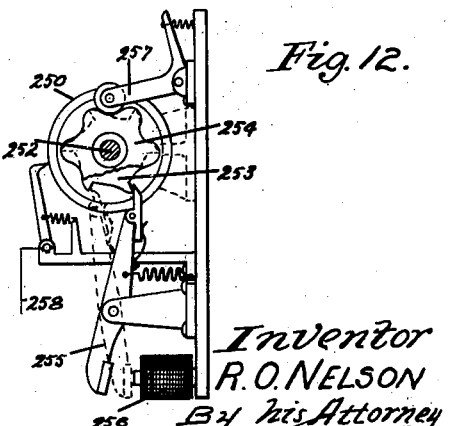

Aug. 10, 1926.

R. O. NELSON

AUTOMATIC PHONOGRAPH

Filed Nov. 26, 1923     7 Sheets-Sheet 6

1,595,241

Inventor
R. O. NELSON
By his Attorney

Aug. 10, 1926.
R. O. NELSON
1,595,241
AUTOMATIC PHONOGRAPH
Filed Nov. 26, 1923  7 Sheets-Sheet 7
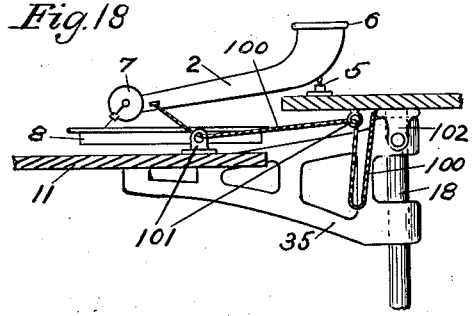
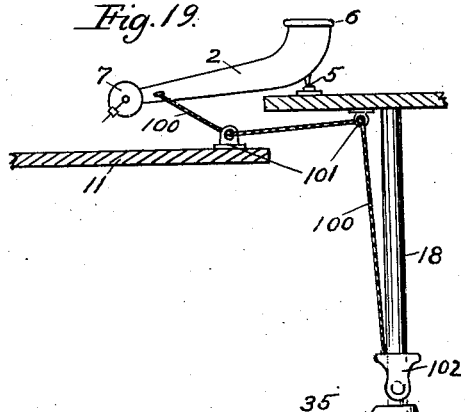
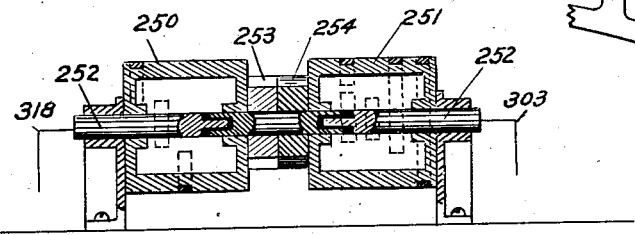
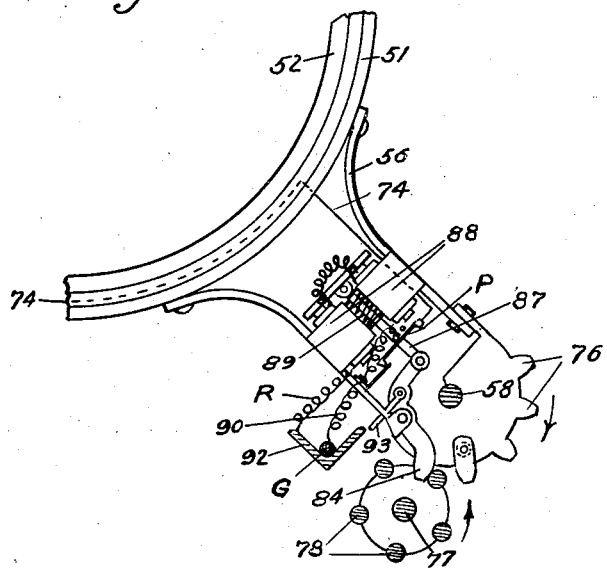
Inventor
R. O. NELSON
By his Attorney Patented Aug. 10, 1926.

1,595,241

UNITED STATES PATENT OFFICE.

ROBERT O. NELSON, OF SAN FRANCISCO, CALIFORNIA.

AUTOMATIC PHONOGRAPH.

Application filed November 26, 1923. Serial No. 677,174.

This invention relates to phonographs or sound reproducing machines and the main object is to provide a highly novel, efficient and practical machine capable of selecting and reproducing any desired record from a repertoire, which is limited only by the size of the machine, by merely dialing a catalogued number and pressing a button on a hand piece, which hand piece is electrically connected with the machine by a flexible conduit, so that the operator may sit or recline in any part of the room or house and select a desired record, dial the corresponding number, press the button, and the machine will then automatically select the desired record from a file of many records, reproduce the selection, and subsequently stop the playing operation and refile the record, leaving the machine in its initial condition, in readiness to reproduce the next record called for. Further objects will be disclosed in the course of the following specification, the invention being illustrated by the structure shown in the accompanying drawings, wherein:

Fig. 1 is a sectional elevation of the machine, as seen substantially on the line 1—1 in Fig. 2.

Fig. 2 is a plan or top view of the machine.

Fig. 3 is a sectional view of the machine as seen substantially on the line 3—3 in Fig. 2.

Fig. 11 is an elevation of what may be termed the master switch.

Fig. 12 is an elevation on the line 12—12 in Fig. 11.

Fig. 13 is a plan view of the contact disks of the left end of the master switch, showing them as separated, for purpose of illustration.

Fig. 14 is similar to Fig. 13, except that it shows the disks on the right hand end of the master switch.

Fig. 15 is a perspective view of what I chose to term the selector, but showing the cylinder or ring of contacts as broken and spread out, for purpose of illustration.

Fig. 16 is a perspective detail view of an escapement switch used in the machine.

Figures 18 and 19 are enlarged detail sectional views illustrating the construction and operation of the tone arm actuating mechanism.

Figure 20 is an enlarged detail view illustrating more clearly the shelf actuator shown in Figure 6.

Figure 21 is a vertical substantially diametrical section through the drums 250—251 as shown in Figure 11.

The drawings will now be referred to by reference characters, like characters designating like parts througout the various figures.

Figure 5:
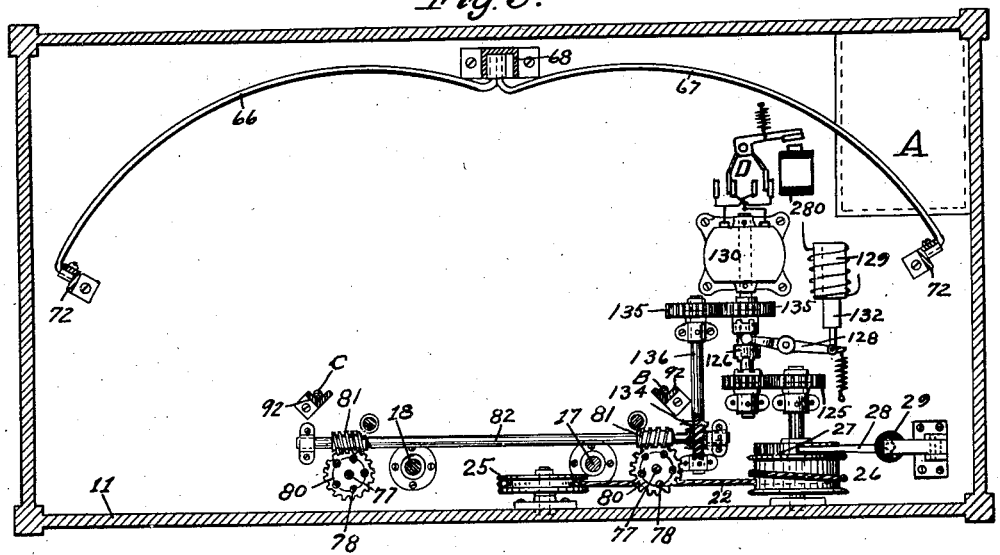
Fig. 5 is a sectional plan view as seen on the line 5—5 in Fig. 3.

The machine consists primarily of a cabinet 11 in the upper end of which is arranged any suitable construction of amplifying horn 1, to the small end of which is connected a tone arm 2, as at 6, in the usual manner. The tone arm may further be supported by a pivot pin 5, and the horn 1 is further secured by a pin 3 of a bracket 4. At the swinging end of the tone arm is provided the usual needle or stylus carrying diaphragm 7.

A record supporting turntable 8 is rotatably mounted upon a carriage 35, which also carries a motor 20 adapted to rotate the turntable through the medium of a gear and shaft transmission 12. The carriage 35 is slidably mounted upon a pair of vertical rods 17 and 18, which are rigidly secured in the rear of the cabinet. The raising and lowering of the carriage is effected by a cable 22, fastened at one end to the carriage as at 21. From 21 the cable passes over a pulley 23, down under a pulley 25 and winds, at its lower end, upon a drum 26. A counterweight 38 may be arranged on the cable 22 to partly offset the weight of the carriage and thus facilitate raising and lowering of the same. A flexible wire 24 supplies a positive current to the turntable motor 20, while a negative supply is secured through a wiper 30 attached to the right arm of the carriage 35. This wiper 30 makes contact with a contact member 32 (fed by a wire 323) when the carriage is in an elevated position, as shown in Fig. 1. Thus the motor 20 will be energized only when the carriage is in an elevated position.

The tone arm 2 is pulled into an initial position for playing a record by a flexible cord 100 which passes through suitable guides 101, its opposite end being secured to a weight 102 which surrounds the rod 18 and rests on the carriage 35 when the latter is in raised position. It will be understood that the cable is slack when the record is being played so that the needle will follow the spiral groove in, and toward the center of, the record. But when the record is played and the carriage is lowered the weight 102 will drop down and pull the tone arm back (into the position shown in Fig. 2) where it is in readiness for the next selected record when it is elevated to be reproduced. To effect the lowering of the carriage when the record has been played I provide a pin 112 in the tone arm which completes a reversing circuit, later to be described, by contacting with a rigidly mounted contact member 111. The carriage is stopped in its upward movement and at the proper playing position by an electric control circuit, which is closed by a wiper 31 (on the carriage) contacting with a member 33 (see Fig. 17).

At both sides of the vertical path of travel of the carriage 35 are arranged series of shelves 51, each of which consists of an open ring (open as at 55) formed of angular sheet metal with an inner flange 52 upon which is retained a record seating rubber ring 54. This ring is preferably irregular so that when a record is dropped upon it by the carriage it will tiltably receive it and prevent any sudden jar or undue noise. The inner sides of the shelf rings are inclined (see Fig. 7) to facilitate record replacement, and the openings in the shelves are sligthly larger than the turntable so that the latter can readily pass therethrough and pick up and deposit records, while the opening 55 is provided to insure a free vertical movement therethrough of the turntable supporting arm of the carriage.

It may be noted that the turntable is provided with an unusually large and tapered center pin 9, which will of course require that the records be also made with larger central apertures than is ordinarily required. But it is obvious that such a pin can be readily replaced when so desired, so that the common records may be played.

The shelves 51 are independently supported and have necks or neck portions 56 which are spaced and rotatably mounted upon fixed vertical bars 58 having annular notches 57. The opposite or swinging ends of the shelf members are slidably supported upon arc shaped rod supports 66 and 67.

Figure 6:
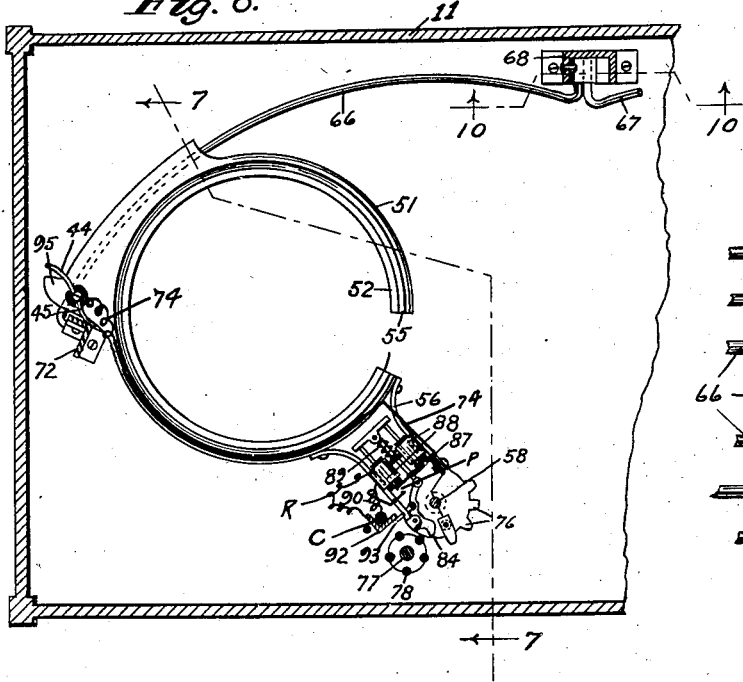
Fig. 6 is an enlarged plan view of the shelf construction.
Figure 10:
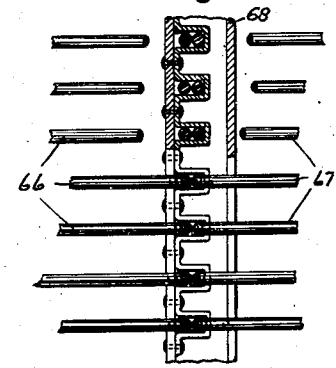
Fig. 10 is an enlarged detail view of the shelf support rod securing means, as seen on the line 10—10 in Fig. 6.
Figure 7:
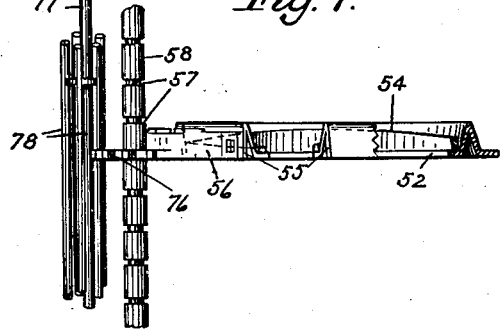
Fig. 7 is a section on the irregular line 7—7 in Fig. 6.
Figure 9:
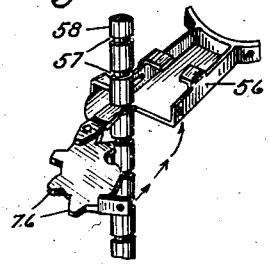
Fig. 9 is a detail view, showing in perspective the shelf neck attaching device.
Figure 8:
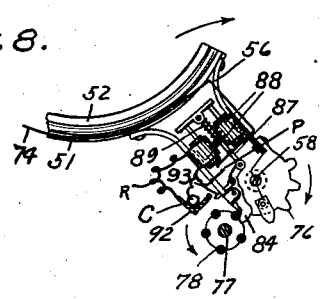
Fig. 8 is a fractional detail view of a portion of the shelf construction as shown in Fig. 6, showing some of the parts as moved into a different position.

Each shelf is moved from idle to operative position and back again by means of a toothed segment 76 adapted to be brought into engagement with a long pinion member 78, on a shaft 77, by means of a master tooth 84 which is pivoted upon the neck 56 in close proximity to the pinion 78 (see Figs. 6, 7 and 20). The position of the tooth is regulated by a pair or solenoids 88, having armature member 87, connected with the tooth. A spring 89 normally holds the tooth 84 in an inactive position when the solenoids 88 are de-energized. A dog 93, actuated by the tooth 84, is arranged to project and stop against a vertical angle bar 92 and lock the shelf in its idle position until it is to be swung away, at which time it is disengaged simultaneously with the projecting of the master tooth, by virtue of the solenoids 88.

The rods 66 and 67, which are concentric with the respective bars 58, are supported at their outer extremities by being secured to vertical angle bars 72, while their inner ends are suitably secured to and insulated from a common standard consisting of a U-bar 68. The bars 68 and 72 also serve to check the movement of the shelves, a projecting stop 95 being formed to strike the bar 68.

Figure 4:
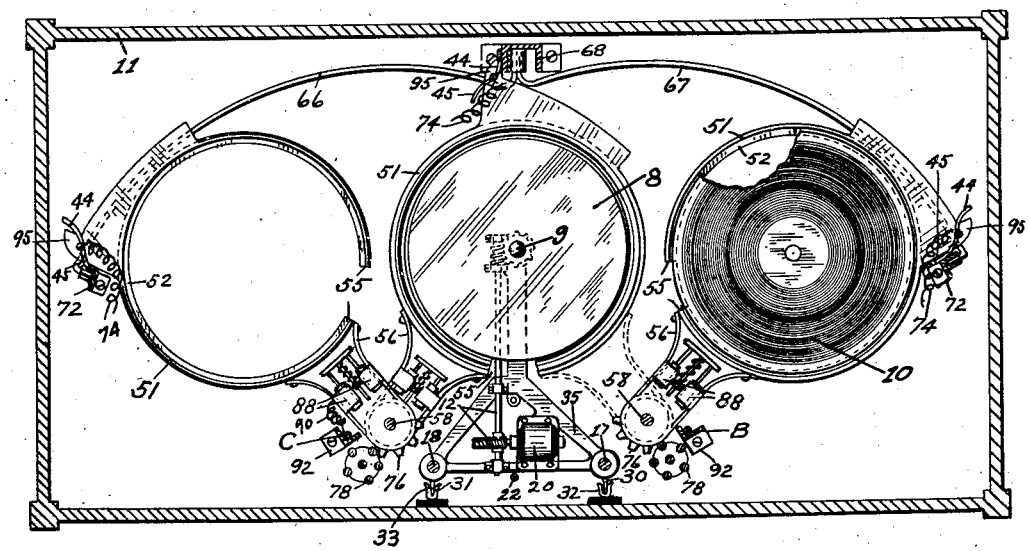
Fig. 4 is a sectional plan view as seen on the line 4—4 in Fig. 1.

A double spring 44—45 is secured to and insulated from each shelf, and is arranged to stop against the bars 68 and 72 in advance of the positive stop of the shelf itself so as to prevent a serious shock or noisy jar. The spring is also the terminal of a coiled wire 74 and serves to complete circuits by respectively contacting with the bars 68 and 72, so as to control the electrically actuated means for moving each shelf from one to the other of its two positions, which positions are indicated in Fig. 4.

To effect the rotation of the shelves 51 I provide a pair of the long vertical pinions 78 each of which is positioned adjacent to one of the vertical columns of toothed segments 76. However, as it is evident that only one shelf is to be brought out at one time, the master teeth 84 of all the shelves are normally retracted and inoperative, as previously mentioned. Now when the solenoids 88 are energized the armature members will overcome the resistance of the spring 89, will disengage the dog 93 and will extend the tooth 84 into engagement with the pinion 78. A coiled extendable wire 90 extends from the solenoid to a cable supported in an angle bar 92 and a negative wire extends from the same cable to the spring 44—45, in a circuit later to be described.

The drum 26, upon which is wound the cable 22, is driven through suitable gearing 125 having a clutch 126, by a motor 130. The clutch 126 normally disengages the drum from the motor and has a lever 128 which is actuated by the core 132 of a solenoid 129, connected in a circuit later to be described, to connect the motor to the drum gear. The drum is also provided with a ratchet wheel 27 which is normally engaged by a dog 28, which dog may be disengaged however, by a magnet 29, and has for its object to insure the stability of the carriage 35 when the record is being reproduced. The magnet 29 is energized and lifts the dog 28 when the record has been played and the carriage is to be lowered. The motor 130 also drives a shaft 82 through the medium of gears 135, shaft 136 and worm gearing 134. The shaft 82 is a transversely arranged shaft which simultaneously drives the pinions in opposite directions through worms 81 meshing with gears 80 on the shafts 77.

The electric control system will now be detailed and described, and although when completely assembled it will be contained almost entirely within the control box A, shown in Fig. 5, it has been illustrated with various parts dis-assembled and the details of construction as well as the diagram of the wiring system are fully illustrated in Figs. 11 to 17, inclusive.

Figure 17:
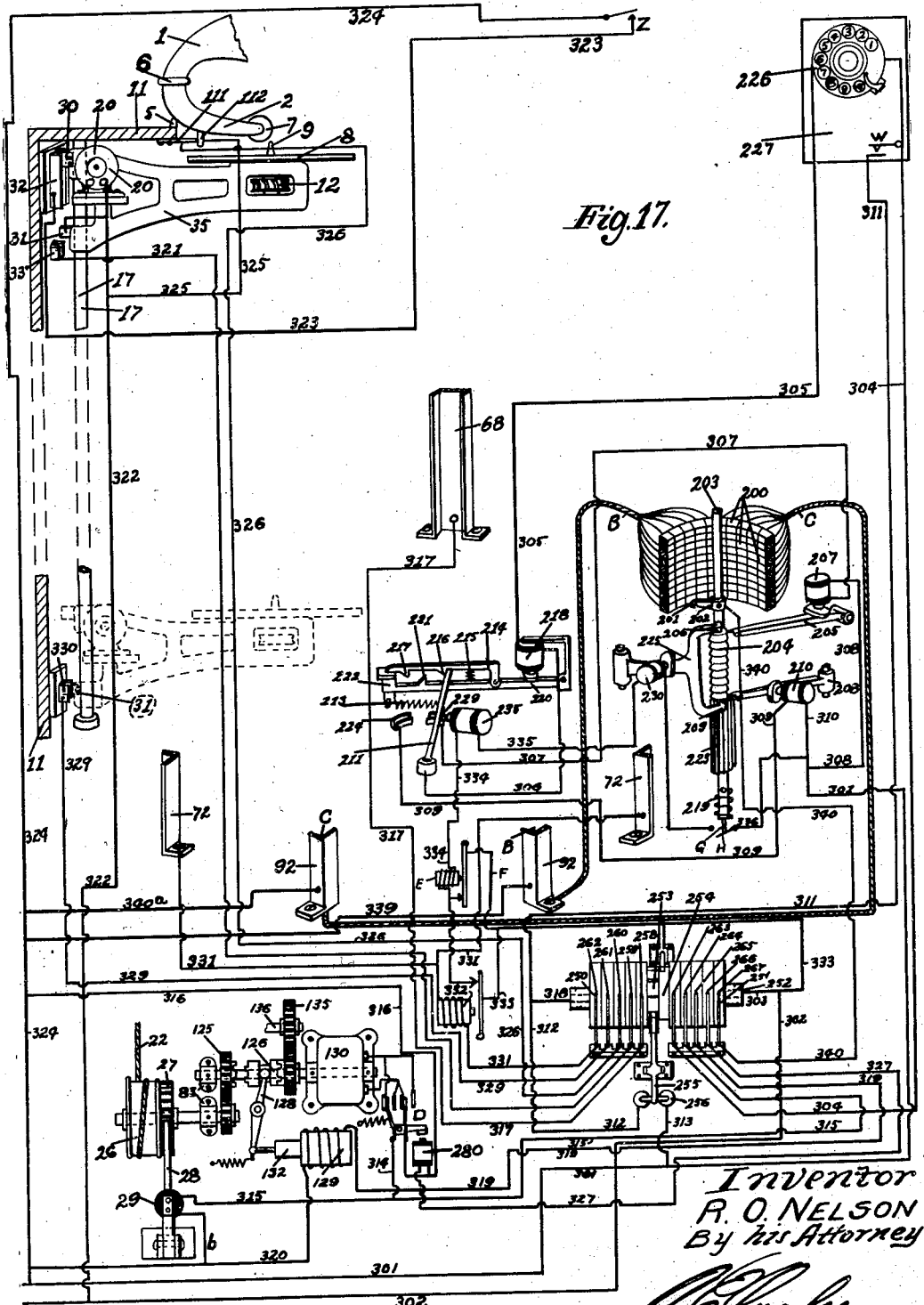
Fig. 17 is a diagrammatic view of the wiring system used in the machine and also shows fragmentary details of such parts and elements of the machine as are necessary to convey an intelligent understanding of the wiring system.

The selector shown in Figs. 15 and 17 will now be referred to, and although it is designed on practically the same principles as that used in automatic telephones it will be briefly explained in order that its function, operation and connection in the circuit may be clearly understood.

The selector consists primarily of a cylindrical cluster or series of one hundred contact blocks 200, arranged in a tier of rows, the tier having ten rows and each row having ten contact blocks 200, each of which is the terminus of the supply wire to a certain shelf magnet. A shaft 203 is concentrically arranged within the cylinder and has an extension 202 with a brush or wiper 201 adapted to contact with the various contact blocks 200. The shaft 203 is also provided with an annularly toothed rack 204 and a vertically toothed ratchet pinion 223. A pawl 205 is actuated by a magnet 207 and is adapted to lift the shaft 203 the length of one tooth of the rack 204 for each time the magnet 207 is energized. A dog 206 of a member 225 resists the return of the shaft and thus with each stimulus to the magnet 207 the shaft is raised the length of one rack tooth and the wiper 201 is elevated successively to the various tiers of contacts 200. A second pawl 208 is actuated horizontally by a magnet 210, to rotate the shaft pinion 223, against the torsional resistance of a spring 219. A dog 209, also of the member 225, retains the pinion 223 in the position to which it has been successively actuated by the pawl 208, thus directing the wiper 201 to the proper vertical row of contacts 200. It will thus be seen that when the magnets 207 and 210 are given a predetermined number of impulses the wiper 201 will be directed to the desired contact block 200. It is evident that no record can be designated by a single number alone, but that two numbers are necessary to effect first a vertical motion and then a horizontal motion to make the contact with the terminal blocks. Thus record #2 would be dialed "02", record #9 would be dialed "09", whereas record #10, or #25, or #99 would have the necessary two numbers. If one hundred or more records were to be available, that would necessitate another selector which would be connected similarly to the automatic telephone system. The member 225 is pivotally mounted and is adapted to be moved by a magnet 230 to simultaneously release the dogs 206 and 209, and permit the shaft 203 to be returned to its initial position by gravity and the spring 219, in readiness for the next selection.

Thus, for example, five impulses to magnet 207 and seven impulses to magnet 210 will cause the wiper 201 to contact with the contact 200 in the fifth tier and seventh from the left. Now to distribute the impulses coming in from a dial 226 through a wire 305, I provide what I chose to call a slow acting switch, as shown in Figs. 16 and 17, and may be described as follows:

Upon a suitable base 228 I arrange a magnet 218 which when energized is adapted to raise an armature bar 220 and retain it in a raised position as long as the stimuli are not longer than one-tenth of a second apart. The bar 220 has an angle piece 214 which is pivotally secured thereto and has a spring 215 normally holding the swinging end of the piece down against an angular extension 222 of the bar 220. The piece 214 has a pair of teeth 216 and 217 and the bar 220 has an intermediate tooth 221, all of which form a spider escapement for the swinging end of a bar 211 which is pivoted to the base and moves between the members 214 and 220. A spring 213 tends to pull the bar 211 to the left, while a magnet 235 is arranged to return it in a right hand direction. When in its initial position the bar 211 normally rests against the tooth 216. When the magnet 218 is energized it pulls the members 220 and 214 upward, releasing the bar 211 which is then caught by the tooth 221. When the magnet 218 is again inactive the armature bar drops and the bar 211 escapes to the tooth 217. A second stimulus to the magnet 218 then raises 217 and permits the bar 211 to drop back to the extension 222. The effect of this movement is to cause a wiper 212, on the bar 211, which is normally in contact with a terminal 229, to break that connection and close a circuit with a second terminal 224. It is to be noted, however, that the circuit through magnets 207 and 218 is not broken with the first complete series of stimuli of not greater than one-tenth second interruption through magnet 207, as the contact between 212 and 229 is still intact. When the bar 220 is released, however, the following movement of the bar 211 causes the wiper 212 to engage the terminus 224 of the magnet 210. To insure and facilitate the proper dispatch of stimuli in the wire 305 an automatic telephone type of dial 226 is placed between the wires 304 and 305.

When the desired connection has been made by the wiper 201 and it has served its purpose, a positive current through a wire 334 will energize the magnet 235 and cause it to pull the bar 211 back to its initial position against the yielding tension of the springs 213 and 215, and the magnet 230 will pull the member 225 and release the dogs 206 and 209 so as to release the shaft 203 and allow it to rotate and return to its initial position. On standard selectors an auxiliary dog on the rack 204 insures a rotary motion to the shaft before it drops but is not thought necessary to be here set forth.

The master switch shown in Figs. 11, 12, 13, 14 and 17, consists of an axle 252 upon the opposite ends of which are secured drums 250 and 251. A ratchet wheel 253 is arranged on the shaft 252 to rotate the drums and is intermittently actuated by a spring held pawl 255 operated by a magnet 256, in such a manner that the ratchet wheel and drums will be rotated one complete revolution for each six operating movements of the pawl 255. An irregular wheel 254, adjacent to the ratchet wheel 253, has a spring held keeper 257 which yieldingly retains the drums in any of their six positions. The two drums each consist of five disks whose peripheral surfaces form contact paths for brushes 258, 259, 260, 261, 262, and 263, 264, 265, 266, 267, respectively. Contact areas (indicated by shaded portions in Figs. 13 and 14) complete circuits from the brushes, on drum 250, through radial wires to the shaft 252, which is insulated from the half of shaft supplying drum 251, through the shaft and a wire 312 to the magnet 256. Thus after the magnet 256 has received an initial stimulus, mentioned later, it will turn the drums as brush 258 closes its circuit, and after a stimulus has passed, the brush 259 is in contact to give a stimulus, and likewise will follow contacts through 260, 261 and 262, until the drum is in its initial position. In a like manner the brushes 263 to 267, inclusive, complete circuits to wire 303, but as the peripheral contact surfaces are differently arranged the initial position of the drum will find the brush 263 in closed circuit while 264 to 267, inclusive, are not. In the second position circuits through 264 and 267 only, are complete. In the third positions circuits are complete through only 264, 265 and 267, etc.

Referring particularly to Fig. 17 of the drawings the electrical connections may be readily traced as follows:

The main supply wires are designated as 301 for the negative and 302 for the positive. A branch wire 303 from 302 gives a positive charge to the contacts on the drum 251. The brush 263 thus gives a positive charge to a wire 304 which runs to the hand piece (227) dial 226. A conventional interrupter having the dial 226 then sends trains of stimuli of positive charges through the wire 305, as previously mentioned, to the slow acting switch which is connected in series with the selector magnets 207 and 210, through wire 306, and elements 211, 229, 307, and 224, 309, respectively, and close circuits to the negative wire 301, by wires 308 and 310.

After the number of the selection has been dialed, and the wiper 201 has made contact with the proper terminal block 200, which supplies the proper shelf magnet through wire in cable or conduits B or C, supported in the angle bars 92, an impulse through a switch W, in the form of a button on the hand piece 227, is conveyed through a wire 311 to the wire 312 which is in circuit with the magnet 256 and the negative wire 313 from 301. The drum will now rotate to its second position, and as a result the brush 263 breaks this circuit until the drum gets back to its initial position. This eliminates any possibility of interference from the hand piece while the machine operates entirely automatic.

The brush 264 now makes contact and supplies the wire 315 with a positive charge, and as it is in series with the magnet 29 the dog 28 is lifted from the ratchet 27 of the drum 26, so the drum is free to turn in either direction, as the current also passes through a reversing switch D of the motor 130. A positive charge passes through a wire 314 (from 315) and the switch D while the negative wire is represented as 316 connecting with a wire 324, a branch of 301.

As the motor is normally in gear with the long pinions 78 (see Fig. 5) they consequently revolve slowly to rotate the shelf encountered into operative or carriage feeding position. The brush 267 maintains its contact in the second position of the drum until the latter is rotated to its initial position and thus supplies a wire 340 to the wiper 201 and thereby to the selected shelf magnet. A wire 74 (see Figs. 4, 20 and 6) on each shelf supplies the contact springs 44—45 on each shelf, while the negative supply to the shelf magnets is obtained through a wire R from the supporting angle bars 92 for the cables B and C, which are supplied by wires 339 and 340ª from the wire 324. The wire 74 has a switch P, controlled by the rod 87, so that a circuit through the wire 74 will only be closed when the shelf magnets are energized.

When the shelf containing the selected record is centered in line with the carriage movement, the spring 44 strikes the supporting U-bar 68, slightly in advance of the stop 95, to prevent jarring, and a circuit is closed through the U-bar 68, wire 317, brush 258, and through the drum (now in its second position), wire 318, wire 312 and magnets 256, which causes the drum to move to its third position, breaking the circuit through brush 258. The motor 130 is still revolving, and the brush 265 now closes a circuit sending a positive charge through a wire 319 to energize the solenoid 129, the negative supply coming through wire 320, a branch of 324. This shifts the gear clutch 126 and the motor proceeds to turn the drum and elevate the turntable, which in turn carries the extended record to its playing position under the stylus. A contact is made between the members 30 and 32 closing a circuit through the motor 20 from wires 322 (from 302) in the flexible cable 24, and a wire 323 which is manually connected and disconnected from wire 324 by a switch Z.

The second wiper 31 on the carriage receives a positive charge through a branch of 322, and as it contacts with member 33 an impulse through wire 321 to brush 259 and wire 318 energizes the magnets 256, and the drums assume the fourth position, breaking the circuit through the brush 259, and leaving the motor 130, the solenoid 129 and the magnet 29 all inactive.

A wire 325 from the supply wire 322 gives the wiper pin 112 on the tone arm a positive charge, and when the record is played, a contact is made with the member 111, sending an impulse through a wire 326, causing the drum to assume its fifth position. This breaks the circuit through the brush 260 and again energizes the elements 130, 29 and 129. The brush 266 also closes a circuit sending a positive change through wire 327 to a magnet 280 of the motor reversing switch D, causing the motor to slowly let drop the carriage, depositing the record again upon its proper extended shelf.

As the carriage now approaches its lowermost position the wiper 31 contacts with a fixed terminal 330, sending an impulse through the elements 329, 261, 318 and 256, effecting a movement of the drum to its sixth position, and breaks the circuit of the brush 261. The motor 130 is still running in reverse and now, due to the disconnection of brush 265, rotates the long pinions 78 in their reversing direction so as to move the extended shelf back into its normally inactive position. At this point the spring 45 contacts with the bar 72, slightly in advance of the stop 65, and an impulse is sent through the members 72, 331, 262, 318, 312, and 256, effecting a movement of the drum to its first or initial position.

In the circuit of the wire 331 is a magnet 332 which closes a circuit from the supply wire 333 (from 302), to the wire 334 of the magnet 235. This pulls the bar 211 back to its initial position, and by energizing the magnet 230 (through 335, 336 and 301), will release the dogs 206 and 209, thus returning all parts to their original or initial position, and in readiness for reproducing the next selection.

As the short stimulus to the magnet 332 from the wire 331 does not give sufficient time for the returning of the selector to its initial position, I provide a magnet E, in the wire 334, which, when energized closes a circuit between wires F (from 333) and 334, so that the magnet E will remain energized after the magnet 332 is inactive. When the shaft 203 of the selector has dropped to normal position, however, a pin G, attached to it, breaks the circuit through wires 336 by opening switch H, and the magnet E again breaks the circuit connection between F and 334.

It is understood that suitable modifications may be made in the general design, structural details, and electric wiring and equipment, provided, however, that such modifications come within the spirit and scope of the appended claims. Having now therefore fully shown and described my invention, what I claim to be new and desire to protect by Letters Patent is:

1. The combination in a phonograph, of reproducing means in the upper end thereof, a turntable supporting carriage vertically movable with respect to and below said means, means for raising and lowering the carriage, pivotally mounted means laterally arranged with respect to the course of the carriage for supporting records, and means for selectively placing any one of the records upon the carriage when the latter is being elevated.

2. The combination in a phonograph, of a reproducing device, a carriage movable to and away from the device, and slidably secured at one end upon a stationary standard a turntable on the carriage, series of record supporting shelves arranged laterally with respect to the course of the carriage, means for selectively projecting any of the shelves into the path of the carriage, said shelves having openings adapted to permit the passage therethrough of said turntable and carriage.

3. The combination in a phonograph, of a reproducing device, a turntable, means for moving the turntable to and away from the reproducing device, record supporting shelves pivotally mounted and arranged adjacent to the course of said turntable in its movement to and away from the reproducing device, means for swinging one of the shelves on its pivot into the said course of the turntable for the purpose of delivering a record to and receiving the same from the turntable, and means for rotating the turntable when advanced to a position in proximity with the reproducing device.

4. The combination with an automatic phonograph having a magazine of records, of a selecting mechanism electrically controlled at a remote distance from the machine for selectively arranging and playing any desired record and subsequently returning it to its inactive position.

5. The combination with a phonograph having a repertory of records arranged on suitable supports in a predetermined manner, of a reproducing device, a turntable arranged to travel to and away from the reproducing device, and means adapted to be controlled at a remote distance from the machine for projecting a predetermined support into the path of travel of the turntable for the purpose of transferring a record from one to the other.

6. The combination with a phonograph having a reproducing device and a repertory of records adapted to be selectively played thereby, of a manually operated interrupter adapted to be arranged at a remote position with respect to the phonograph, means for transferring any record from its normally inactive position in the repertory to a playing position near the reproducing device, and a selector mechanism automatically controlled by the interrupter for predeterminately selecting the particular record desired to be transferred.

7. The combination with a phonograph of the character described having a reproducing device, of record supporting shelves each adapted to be moved into a delivering and receiving position, a turntable adapted to be moved through one of said shelves to receive a record from and deliver it thereto, when the latter is in said position, said shelves each having a record seat arranged at a slight angle with respect to the plane of the turntable.

8. The combination with a phonograph having a reproducing device, of record supporting shelves each adapted to be moved into a delivering and receiving position, a turntable adapted to be moved through one of said shelves to receive a record from and deliver it back to the shelf when the latter is in said position, said shelves each having a record seat and an upwardly flaring flange thereabout.

9. The combination with a phonograph having a reproducing device, of record supporting shelves each adapted to be moved into a delivering and receiving position, a turntable adapted to be moved through one of said shelves to receive a record from and deliver it back to the shelf when the latter is in said position, said shelves each having a record seat arranged at a slight angle with respect to the plane of the turntable, and a tapered centering pin in the turntable, to engage a record.

10. The combination with a phonograph having a reproducing device, of record supporting shelves each adapted to be moved into a delivering and receiving position, a turntable adapted to be moved through an extended shelf to receive a record from or deliver it thereto, said shelves each consisting of an open ring having an inner flange forming a record seat and an inclined inner wall projecting upwardly from the flange.

11. The combination in a machine of the character described, of a reproducing device, a carriage vertically movable with respect to the device, a column of record supporting shelves mounted upon a common vertical axis adjacent to the course of movement of the carriage, means for concentrically and independently mounting the shelves so that they may be swung from their normally inactive position in the column to a position in the line of travel of the carriage, and a turntable on the carriage adapted to remove and replace each record with respect to its supporting shelf, when moved together with the carriage.

12. In a phonograph, a reproducing device, a turntable supporting carriage, means for moving the carriage to and away from the reproducing device, record supports arranged laterally with respect to the path of movement of the carriage, means for selectively projecting any one of the shelves into said path, and means controlled by the movement of the supports for automatically actuating the carriage moving means.

13. In a phonograph, a reproducing device, a carriage mounted to move vertically with respect to and below the device, a turntable on the carriage, a record support normally retained in inactive position near the course of movement of the carriage, means for projecting the support into operative position with respect to the carriage, means actuated by the movement of the support into operative position to elevate the carriage, and means actuated by the lowering of the carriage to return the support to its normally inactive position.

14. The combination with a phonograph having a turntable adapted to support a record, and a stylus carrying tone arm adapted to travel over the record during the reproduction thereof, of a carriage supporting said turntable and vertically movable with respect to the tone arm, means for lowering the carriage when the tone arm reaches a predetermined position in its movement over the record, and means actuated by the downward movement of the carriage to return the tone arm to its initial position.

15. In a phonograph having a reproducing device, a repertory of records and a movable turntable, the combination including means to selectively withdraw a record from the repertory, place it on the turntable and carry it into operative contact with the reproducing device, means actuated by the completion of said operation to rotate the turntable, and means to automatically stop rotation of the turntable and to return the record to its initial position after the same has been reproduced.

16. The combination with a phonograph having a reproducing device and a column of individually supported records, of a carriage having a turntable and laterally movable with respect to the column, means for selectively projecting a record from the column into the line of movement of the carriage and for delivering and receiving engagement with the turntable, means controlled by the projecting movement of the record to actuate the carriage toward the reproducing device, means for returning the carriage to its initial position after the record has been played, and means actuated by the returning movement of the carriage to its initial position to refile the record in its original place in the column.

17. The combination with a phonograph having a reproducing device, of a vertical column of record supporting shelves, a turntable carrying carriage movable laterally with respect to the column and below the reproducing device, a projecting device arranged parallel with the column of shelves to project any desired shelf into the path of travel of the carriage, means for selectively engaging any one of the shelves with the projecting device.

18. The combination with a phonograph having a reproducing device, of a vertical column of record supporting shelves, a turntable carrying carriage movable laterally with respect to the column and below the reproducing device, a projecting device arranged parallel with the column of shelves to project any desired shelf into the path of travel of the carriage, means for selectively engaging any one of the shelves with the projecting device, and means to reverse the operation of the projecting device to return the shelf to its initial position.

19. The combination with a phonograph having a reproducing device, of a vertical column of record supporting shelves, a turntable carrying carriage movable laterally with respect to the column and below the reproducing device, a projecting device arranged parallel with the column of shelves to project any desired shelf into the path of travel of the carriage, means for selectively engaging any one of the shelves with the projecting device, and means for releasably locking the remaining shelves in their normally inactive position.

20. In a phonograph, a tone arm adapted to swing over a record, a carriage movable to and away from the tone arm, a record supporting turntable on the carriage, a motor adapted to actuate the carriage toward the tone arm, a circuit including said motor, a second circuit to reverse said motor and adapted to be closed by a movement of the tone arm to withdraw the carriage from its position adjacent to the tone arm.

21. The combination in a phonograph, of reproducing means in the upper end thereof, a turntable supporting carriage vertically movable with respect to and below said means, electrically actuated means for raising and lowering the carriage, means laterally arranged with respect to the course of the carriage for supporting records, and means for selectively placing any one of the records upon the carriage when the latter is being elevated.

22. The combination in a phonograph, of reproducing means in the upper end thereof, a turntable supporting carriage vertically movable with respect to and below said means, means for raising and lowering the carriage, means laterally arranged with respect to the course of the carriage for supporting records, and electrically controlled means for selectively placing any one of the records upon the carriage when the latter is being elevated.

23. The combination in a phonograph, of a reproducing device, a carriage movable to and from the device, a turntable on the carriage, series of record supporting shelves arranged laterally with respect to the course of the carriage, manually controlled electrically operated means for selectively projecting any of the shelves into the path of the carriage, said shelves having openings adapted to permit the passage therethrough of said turntable.

24. The combination in a phonograph, of reproducing means in the upper end thereof, a turntable supporting carriage vertically movable with respect to and below said means, electrically operated means for raising and lowering the carriage, means laterally arranged with respect to the course of the carriage for supporting records, and manually controlled electrically operated means for selectively placing any one of the records upon the carriage when the latter is being elevated.

25. The combination in a phonograph, of a reproducing device, a turntable, means for moving the turntable to and away from the reproducing device, record supporting shelves arranged adjacent to the course of said turntable in its movement to and away from the reproducing device, magnetically controlled means for projecting one of the shelves into the said course of the turntable, for the purpose of delivering a record to and receiving the same from the turntable, and a motor for rotating the turntable when advanced to a position in proximity with the reproducing device.

26. The combination with a phonograph having a reproducing device and a repertory of records adapted to be selectively played thereby, of a manually operated circuitously arranged interrupter adapted to be arranged at a remote position with respect to the phonograph, means for transferring any record from its normally inactive position in the repertory to a playing position near the reproducing device, and a selector mechanism automatically controlled by the interrupter and in circuit therewith for predeterminately selecting the particular record desired to be transferred.

27. The combination in a phonograph, of reproducing means in the upper end thereof, a turntable supporting carriage vertically movable with respect to and below said means, means for raising and lowering the carriage, means laterally arranged with respect to the course of the carriage for supporting records, means for selectively placing any one of the records upon the carriage when the latter is being elevated, and a motor arranged in a circuit, controlled by the movement of the carriage, for rotating the turntable when the carriage is in its uppermost position.

28. In a phonograph, a reproducing device, a carriage mounted to move vertically with respect to and below the device, a turntable on the carriage, a record support normally retained in inactive position near the course of movement of the carriage, magnetically operated and electrically controlled means for projecting the support into operative position with respect to the carriage, means actuated by the movement of the support into operative position to elevate the carriage, and means actuated by the lowering of the carriage to return the support to its normally inactive position.

29. In a phonograph having a reproducing device, a repertory of records and a movable turntable, the combination including electrically operated means to selectively withdraw a record from the repertory, to place it on the turntable and to carry it into operating contact with the reproducing device, means actuated by the completion of said operation to rotate the turntable, and electrically operated means to automatically stop rotation of the turntable and to return the record to its initial position after the same has been reproduced.

30. The combination with a phonograph having a reproducing device, of a vertically arranged column of record supporting shelves, a turntable supporting carriage movable laterally with respect to the column and below the reproducing device, a projecting device arranged parallel with the column of shelves to project any desired shelf into the path of travel of the carriage, electrically operated circuitously controlled means for selectively engaging any one of the shelves with the projecting device.

31. A control system for a phonograph of the character described, comprising a selector included in a primary circuit with a master switch, a turntable carriage motor, a turntable motor, shelf selecting magnets, and a tone arm switch, all connected in secondary circuits with the master switch so that the latter will be actuated by successively closing said secondary circuits.

32. In a control system for an automatic phonograph, a selector and a master switch included in circuit, a series of secondary control circuits, means effected by the closing of certain of said circuits to successively actuate the switch, and means controlled by such movements of the switch to open and close certain other circuits.

33. In a control system for an automatic phonograph, a selector included in circuit with a master switch, said switch consisting of a rotatable member having peripheral arranged contacts adapted to be respectively closed by brushes, and a series of control circuits adapted to be respectively opened and closed by said master switch through said brushes.

34. In a control system for an automatic phonograph, a selector included in circuit with a master switch, said switch consisting of a rotatable member having peripherally arranged contacts adapted to be respectively closed by brushes, and a series of circuits, including said switch, adapted to successively rotate the same.

35. A control system for an automatic phonograph including a selector, shelf magnets included in respective circuits with the selector, means operated through the selector to selectively close the magnet circuits, and a series of secondary control circuits, and means for closing and opening said secondary circuits with predetermined co-ordinate respect to the closing and opening of a magnet circuit.

In testimony whereof I affix my signature.

ROBERT O. NELSON.